US006459989B1

(12) United States Patent
Kirkpatrick et al.

(10) Patent No.: US 6,459,989 B1
(45) Date of Patent: Oct. 1, 2002

(54) PORTABLE INTEGRATED INDOOR AND OUTDOOR POSITIONING SYSTEM AND METHOD

(75) Inventors: Michael Kirkpatrick, Hayward; Jeffrey Casper; Clay Ross, both of Mountain View; D. Scott Seaton, Fremont; Christian Gellrich, Redwood City; Michael Cutter, Fremont; James Binnion, Oakland, all of CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/517,897

(22) Filed: Mar. 3, 2000

(51) Int. Cl.$^7$ .............................. G01C 2/00; G01S 1/02; G01S 1/72; G06F 17/00; G06F 19/00
(52) U.S. Cl. ................. 701/215; 701/213; 701/214; 701/207; 340/988; 340/426; 342/457; 342/450; 342/45; 342/357.06; 342/357.09; 342/357.17; 455/62; 455/452; 455/465; 455/509; 370/431; 370/329; 370/316; 370/320
(58) Field of Search .................... 701/215, 213, 701/214, 207; 455/465, 452, 62, 509; 340/988, 426; 342/457, 357.06, 450, 357.09, 45, 357.17; 379/200, 16, 199, 230, 231; 370/316, 329, 320, 431

(56) References Cited

U.S. PATENT DOCUMENTS

| 5,361,399 A | * 11/1994 | Linquist et al. ............. 455/56.1 |
| 5,592,481 A | * 1/1997 | Wiedeman et al. .......... 370/316 |
| 5,594,740 A | * 1/1997 | LaDue ......................... 379/59 |
| 5,727,057 A | * 3/1998 | Emery et al. ................ 379/211 |
| 5,734,963 A | * 3/1998 | Fitzgerald et al. .......... 455/31.2 |
| 5,742,509 A | * 4/1998 | Goldberg et al. ......... 364/449.5 |
| 5,752,164 A | * 5/1998 | Jones .......................... 455/33.1 |
| 5,765,112 A | * 6/1998 | Fitzgerald et al. ........... 455/509 |
| 6,028,537 A | * 2/2000 | Suman et al. ................ 340/988 |

OTHER PUBLICATIONS

Thomas A. Herring, "The Global Positioning System—Two dozen satellites hovering thousands of miles out in space are allowing people to locate themselves on the earth's surface with remarkable precision," *Scientific American*, Feb. 1996, pp. 44–50.

Peter H. Dana, "Global Positioning System Overview," http://www.utexas.edu/depts/grg/gcraft/notes/gps/gps.html#DODsystem, printed Oct. 14, 1999, pp. 1–12 and 2–page Table of Contents, Revised: Aug. 24, 1999 (first published in Sep., 1994) Department of Geography, University of Texas at Austin.

*Portable Design* "This PET locates its master," Paul R. Gendreau, Jr., Mar. 1999.

"Point Men for a Revolution—Can the Marines Survive a Shift From Hierarchies to Networks?" *The Washington Post*, Mar. 6, 1999.

* cited by examiner

*Primary Examiner*—Yonel Beaulieu
*Assistant Examiner*—Ronnie Mancho
(74) *Attorney, Agent, or Firm*—Testa, Hurwitz & Thibeault, LLP

(57) ABSTRACT

An integrated indoor and outdoor positioning system and method. A first communication unit aperiodically emits an ultrasonic signal. A second communication unit receives the ultrasonic signal and transmits an identification signal in response to receiving the ultrasonic signal. One of the two communication units is placed at a predetermined position and the other of the two communication units is placed with an object. Identification information obtained from the identification signal is used to determine position information indicating that the object is at the predetermined position. The first communication unit is placed at the predetermined position and the second communication unit accompanies the object. Alternatively, the first communication unit accompanies the object and the second communication unit is placed at the predetermined position. One of the two communication units may also include a GPS receiver for receiving GPS signals from a plurality of satellites or pseudolites and computing position information therefrom. The GPS receiver applies differential GPS corrections computed by a GPS reference receiver to improve the accuracy of the position information. Position information is transmitted to a base station over an assigned radio frequency and during a time slot allocated to the communication unit that is transmitting the position information.

34 Claims, 8 Drawing Sheets

PORTABLE INTEGRATED INDOOR AND OUTDOOR POSITIONING SYSTEM AND METHOD

GOVERNMENT SUPPORT

This invention was made with government support under Contract M67854-98-C-2098 awarded by the Marine Corps Warfighting Laboratory. The government has certain rights in the invention.

FIELD OF THE INVENTION

The invention relates generally to positioning systems. More specifically, the invention relates to positioning systems that integrate global positioning systems with indoor positioning systems.

BACKGROUND OF THE INVENTION

Global positioning systems (GPS) are able to determine the relative position of an antenna coupled to a GPS receiver on or above the surface of the Earth. Twenty-four satellites placed in orbit around the Earth continuously transmit GPS signals on an L-band carrier (L1) frequency of 1.575 GHz. The L1 carrier component is modulated by a course acquisition (C/A) pseudo random noise (PRN) code component and a data component. The PRN code component provides timing information for determining when a satellite transmitted the GPS signal. The data component includes information such as the orbital position of the transmitting satellite. From the timing and satellite orbital position information in the PRN code and data components obtained from the GPS signals of at least four GPS satellites, the GPS receiver performs ranging measurements. By receiving four different GPS signals, the GPS receiver can determine the position of the antenna within meters.

To improve upon the accuracy of GPS, industry developed Differential GPS (DGPS), which is a variant of GPS that uses a fixed ground reference GPS receiver with a precisely known location to relay GPS corrections to a mobile GPS receiver. A general principle of DGPS is that satellite ranging errors affect the reference GPS receiver and mobile GPS receiver alike. Just like the mobile GPS receiver, the reference GPS receiver computes its position from the received GPS signals. The reference GPS receiver then detects ranging errors by comparing the computed position to the known position and computes corrections to these ranging errors for real-time transmission to the mobile GPS receiver. The reference GPS receiver can transmit the corrections using a tradition digital data link to the mobile GPS receiver. Consequently, the mobile GPS receiver applies the corrections to the measurements made from GPS signals received from the same set of satellites as the reference receiver to improve upon its own computed position measurement.

DGPS systems operate best when the antenna of the GPS receiver is outdoors to receive the GPS signals from the satellites (or pseudolites). GPS signals typically fade considerably or completely when penetrating the walls of structures, e.g., buildings. Consequently, a DGPS ceases to track an object bearing the antenna once that object enters indoors. Thus, there remains a need for a comprehensive positioning or tracking system that can track objects both indoors and outdoors.

SUMMARY OF THE INVENTION

An object of the invention is to integrate indoor tracking with outdoor tracking. Another object is to enable the tracking of multiple objects simultaneously without producing false position determinations. It is a further object of the invention to enable the tracking system to be portable.

One aspect of the invention features a system for determining a position of an object. The system includes a first communication unit that has a transmitter. The transmitter aperiodically emits an ultrasonic signal. A second communication unit has a receiver to receive the ultrasonic signal and a transmitter to transmit an identification signal in response to receiving the ultrasonic signal. One of the two communication units is placed at a predetermined position and the other of the two communication units is placed with an object. A processor uses identification information obtained from the identification signal to produce position information indicating that the object is at the predetermined position. In one embodiment, the first communication unit is placed at the predetermined position and the second communication unit accompanies the object. In another embodiment, the first communication unit accompanies the object and the second communication unit is placed at the predetermined position.

In one embodiment, the system includes a timer that produces a window of time and a receiver in communication with the timer. The receiver accepts any identification signal that arrives within the window of time and ignores any identification signal that arrives outside of the window of time. The timer opens the window of time a predetermined period of time after the transmitter of the first communication unit emits the ultrasonic signal. As an example, the predetermined period of time approximates a period of time required for the ultrasonic signal to propagate to the second communication unit.

The information conveyed by the identification signal depends upon the particular embodiment. In one embodiment, the identification signal includes information that leads to identifying the predetermined position. For example, the identification signal in this embodiment includes the serial number of the communication unit that transmits the identification signal. A control station maintains a table that cross-references serial numbers of communication units to particular positions where each communication unit is located.

In another embodiment, the identification signal includes information that leads to identifying the object at the predetermined position. Again, the identification signal includes the serial number of the communication unit that transmits the identification signal. A control station maintains a table that cross-references serial numbers of communication units to particular objects accompanying that communication unit.

In another embodiment, the system includes a differential global positioning system (DGPS) that is capable of computing a position of the object from GPS signals received from remote signal transmitters.

In another aspect, the invention features a method for tracking an object. A first communication unit is placed at a predetermined position and a second communication unit accompanies the object. An ultrasonic signal is aperiodically emitted from one of the communication units. A window of time having a limited duration is opened for receiving a response to the ultrasonic signal from the other of the communication units. The response to the ultrasonic signal is accepted if the response arrives within the opened window of time. The predetermined position is associated with the object based on information provided with the response.

In one embodiment, position information of the object is computed from GPS signals received from a plurality of remote signal transmitters using a differential global positioning system (DGPS). In another embodiment, a frequency is assigned to one of the communication units for communicating with a base station and a time slot is allocated within the assigned frequency during which that one communication unit can transmit position information to the base station. In still another embodiment, the ultrasonic signal is detected at more than one position, and an approximate position of the object is calculated based in part on when the ultrasonic signal was detected at each position.

In another aspect, the invention features a system for tracking a position of an object that includes a global positioning system that computes position information about the object when the global positioning system is able to receive signals from a signal transmitter. An indoor tracking system that includes a communication unit placed at a predetermined position, determines position information about the object when the object enters within a predetermined range of the communication unit. A processor receives the position information about the object for transmission to a base station.

In another aspect, the invention features a portable apparatus that accompanies an object and is used for determining a position of the object. A transceiver is placed at a predetermined location. The apparatus includes a global positioning system (GPS) receiver that computes the position of the object from signals concurrently received from a plurality of signal transmitters. A communication unit exchanges ultrasonic and radio frequency signals with a transceiver to determine the position of the object when the object is within range of the transceiver. This transceiver is placed at a predetermined location. A processor receives position information determined by either or both of the GPS receiver and the communication unit.

DESCRIPTION OF THE FIGURES

The above and further objects, features, and advantages of the invention will become clear from the following detailed description when read with reference to the accompanying drawings in which.

DETAILED DESCRIPTION OF THE INVENTION

Figure 1:
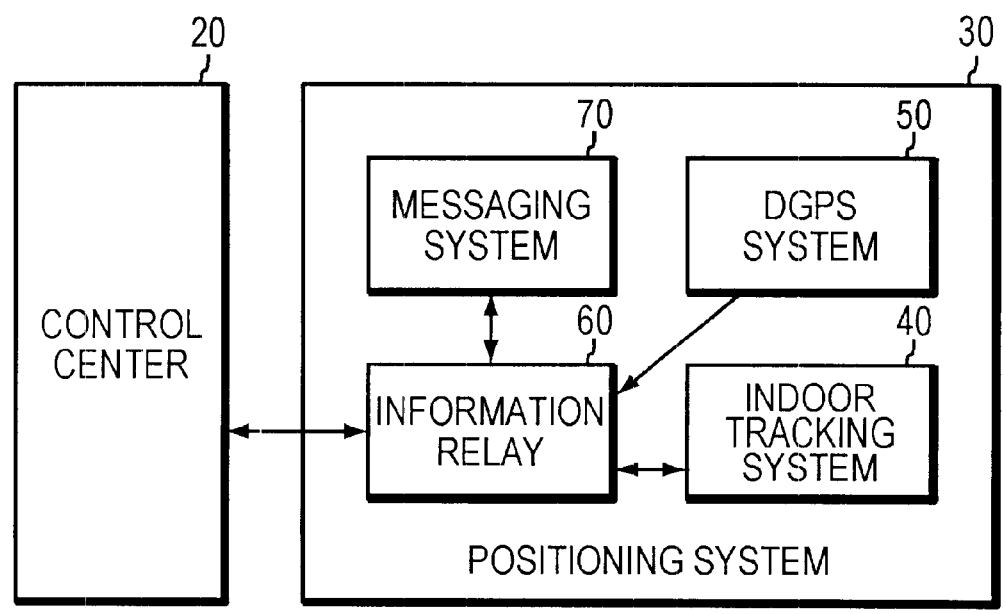
FIG. 1 is a block diagram of an indoor and outdoor object tracking system embodying the principles of the invention.

FIG. 1 shows a tracking system 10 including a control center 20 in communication with a positioning system 30 to track objects indoors and outdoors in accordance with the principles of the invention. In general, an object is a person, animal, or thing that moves or can be moved. Examples of objects include individuals (e.g., children, soldiers, firefighters, law enforcement officers, and rescue personnel), domestic and wild animals, vehicles (e.g., automobiles, ships, aircraft, rail systems, etc.), and inventory, etc. As described in more detail below, the tracking system 10 is capable of simultaneously tracking the positions (or locations) of numerous objects in real-time. For example, during an experimental test, the tracking system 10 concurrently tracked the positions of 700 military personnel.

The positioning system 30 integrates an indoor tracking system 40 with a differentially corrected global positioning system (DGPS) 50 to achieve indoor and outdoor tracking, respectively. An information relay 60 is in communication with the indoor tracking system 40 and the DGPS 50 to receive object position information produced by the indoor tracking system 40 and the DGPS 50 and to forward such position information to the control center 20.

The information relay 60 is also in communication with a messaging system 70. In some applications embodying the invention, the control center 20 may want to convey information to the tracked object. For example, in a war game situation in which the tracking system 10 is used to track soldiers on a mock battlefield, the control center 20 can exchange messages with each soldier equipped with the messaging system 70 through the information relay 60. In the embodiment shown, the positioning system 30 includes the information relay 60 and the messaging system 70; in other embodiments, either or both of the information relay 60 and messaging system 70 can be separate from the positioning system 30.

In brief overview, the positioning system 30 simultaneously and continuously determines the indoor and outdoor positions of a plurality of objects in real-time. The continuous position determinations enable the tracking of the movement of each object. To achieve this tracking, each tracked object is equipped with a portable unit (described in more detail below) that achieves the functionality of the indoor tracking system 40 and with the DGPS 50.

While an object is outdoors, the DGPS 50 can usually compute the position of that object and send the object position information to the information relay 60. Such object position information includes longitude and latitude values identifying the geographical location of the tracked object. The ability of the DGPS 50 to track the object diminishes and typically ceases when the object moves into a structure, such as a building. In accordance with the principles of the invention, the indoor tracking system 40 takes over where the capabilities of the DGPS 50 leave off by determining the position of each object that moves into that structure. Although suited for indoor tracking, the indoor tracking system 40 can be deployed outdoors to supplement the tracking capabilities of the DGPS 50. (Hereafter, references to indoor object positions mean those object positions determined by the indoor tracking system 40, irrespective of whether the object is actually indoors. References to outdoor object positions mean those object positions determined by the DGPS 50.)

The object position information produced by the indoor tracking system 40 also passes to the information relay 60. In one embodiment, the information relay 60 chooses between the object position information concurrently produced by the DGPS 50 and the indoor tracking system 40 for a given object. For example, in one embodiment the information relay 60 prioritizes indoor object position information over outdoor object position information. Thus, when indoor and outdoor object position information are concurrently available for the given object, the information relay 60 sends only the indoor object position information to the control center 20.

The control center 20 maintains the current position information for every tracked object. To facilitate the tracking of the objects, the control center 20 displays the position information on a computer screen, e.g., by displaying a map and placing each object on that map.

Figure 2:
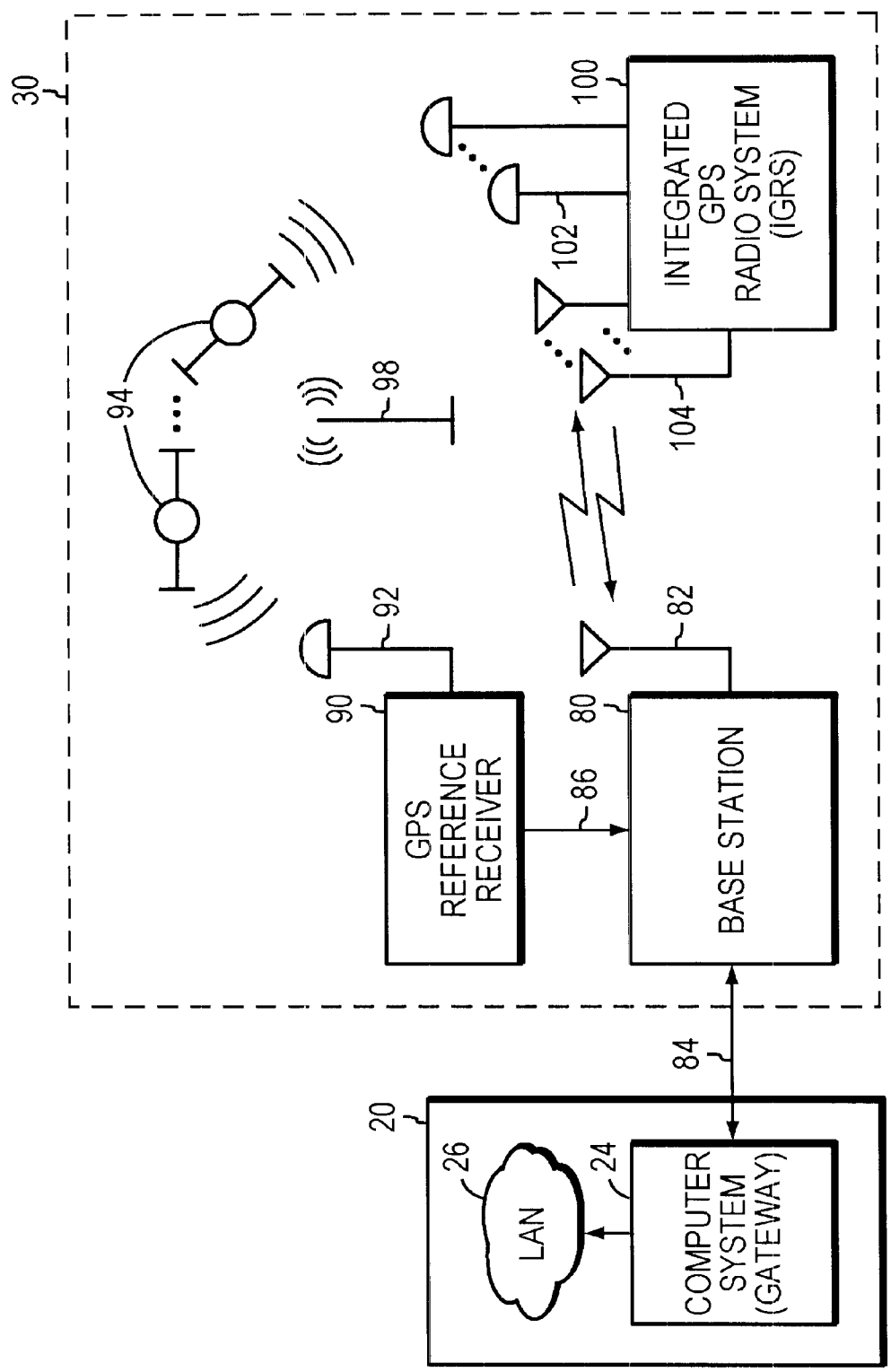
FIG. 2 is a diagram of an embodiment of the tracking system of FIG. 1, including a base station, integrated global positioning system (GPS) radio system, and a control center.

FIG. 2 shows an exemplary embodiment of the tracking system 10 of FIG. 1. In this embodiment, the control center 20 includes a computer system 24 operating as a gateway to a local area network (LAN) 26. The positioning system 30 includes a base station 80 in communication with a GPS reference receiver 90 and an integrated GPS radio system (IGRS) 100. The GPS reference receiver 90 and the IGRS 100 each include a GPS antenna 92, 102, respectively, to receive GPS signals from signal transmitters such as satellites 94 and/or ground-based signal transmitters (i.e., pseudolites) 98. As described in more detail below, the IGRS 100 supports the concurrent tracking of a plurality of objects. Each object tracked by the positioning system 30 is equipped with a portable communication unit that is part of the IGRS 100. Specifically, the IGRS 100 includes a GPS antenna 102 for each tracked object.

The IGRS 100 and the GPS reference receiver 90 receive GPS signals from the same set of at least four signal transmitters 94, 98. The GPS reference receiver 90 is situated at a precisely known location and, consequently, computes corrections for satellite ranging errors detected in the received GPS signals as is known in the art. The corrections pass from the GPS reference receiver 90 to the base station 80 over communication link 86.

In one embodiment, the base station 80 is stationary (i.e., at a fixed location) and includes at least one radio antenna 82 to communicate with one or more radio antenna(s) 104 of the IGRS 100. Each tracked object is associated with one of the radio antenna(s) 104. As described further in connection with FIG. 7, each object communicates by radio with the base station 80 to exchange messages, object position information, and corrections.

The base station 80 is also in communication with the control center 20 over a communication link 84 to transfer object position information and to receive messages directed to the objects. The communication link 84 can be one of a variety of connections including standard telephone lines, LAN or WAN links (e.g., T1, T3, 56 kb, X.25), broadband connections (ISDN, Frame Relay, ATM), and wireless connections.

During operation, the GPS reference receiver 90 receives GPS signals from the signal transmitters 94 and computes the position of the GPS reference receiver 90 from the received GPS signals. The GPS reference receiver 90 then computes differential corrections to the satellite ranging errors from the computed position and the known positions of the GPS reference receiver 90, and forwards the computed corrections to the base station 80. The base station 80 then transmits GPS differential corrections to each object tracked by the IGRS 100 over at least one predetermined radio frequency.

Each object tracked by the IGRS 100 also receives the GPS signals received by the associated antenna 102 from the signal transmitters 94 and the GPS differential corrections from the base station 80. From the GPS signals, each object computes its own position, using the differential corrections to improve the accuracy of the computed position (hereafter referred to as the DGPS position). For each object that is in an appropriately equipped structure, as described in more detail below, the IGRS 100 also produces indoor object position information for that object in accordance with the principles of the invention. The IGRS 100 sends the DGPS and indoor object position information to the base station 80 by radio transmission as described in more detail below. The base station 80 reports the object position information to the control center 20 over the communication link 84.

Figure 3A:
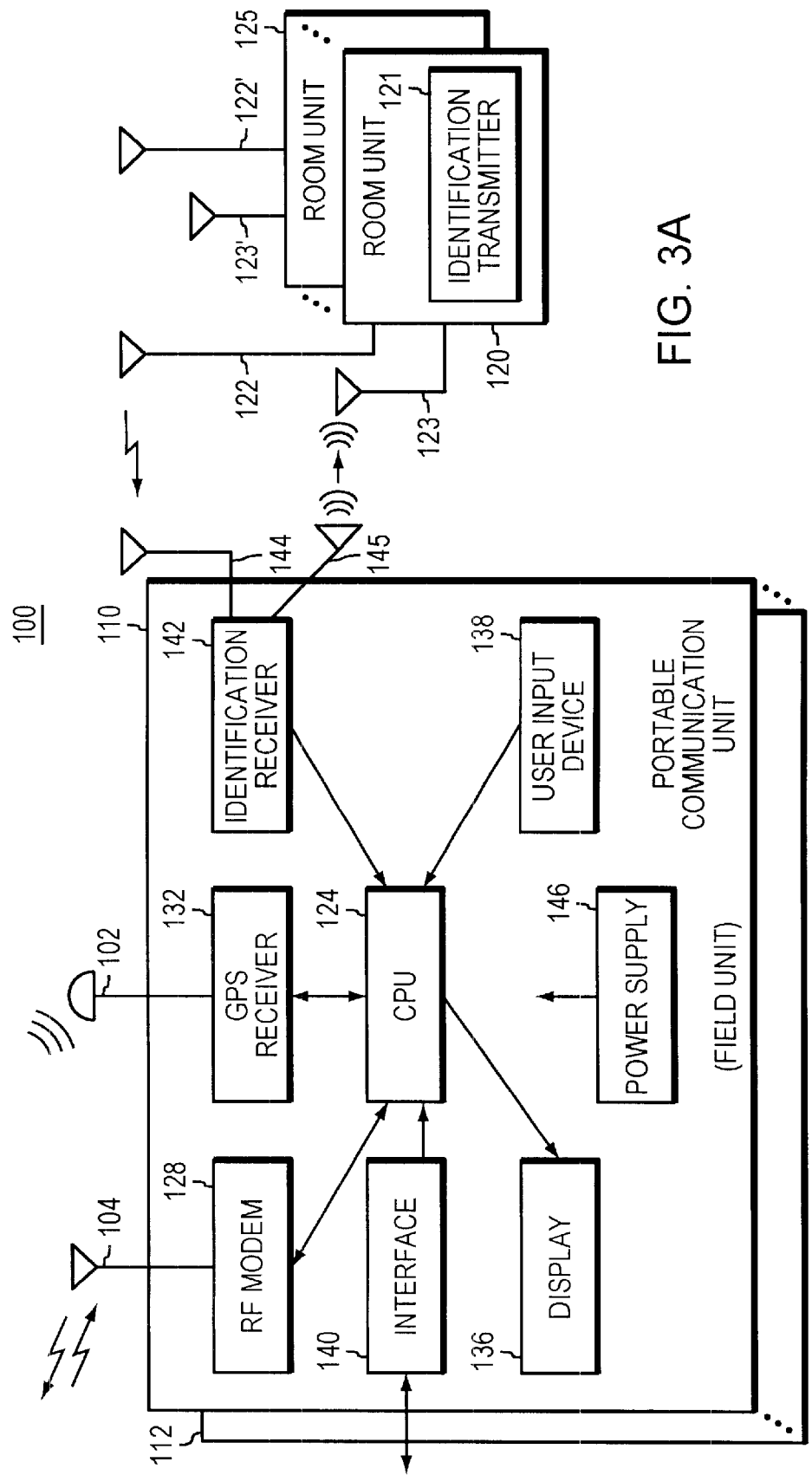
FIGS. 3A and 3B are block diagrams of embodiments of the integrated GPS radio system (IGRS), each embodiment including an ID transmitter and an ID receiver.

FIG. 3A illustrates an exemplary embodiment of the IGRS 100 including one or more portable outdoor/indoor communication units 110, 112, (hereafter "field units"), in communication with one or more room units 120, 125. Each portable field unit 110, 112 is carried, worn, or placed with an object to be tracked. For example, in one embodiment, each field unit 110, 112 is incorporated into clothing worn by military personnel or attached to a utility belt like a hand-held radio. In another embodiment, each field unit 110, 112 is implemented as a standard laptop computer adapted to operate a described below. The control center 20 maintains a table that maps the identification of each field unit 110, 112 with the particular object associated with that field unit 110, 112.

Each room unit 120, 125, is placed at a location, e.g., in a room within a building. A given location (e.g., room) can have more than one room unit 120, 125. In general, each room unit 120, 125 is portable for easy placement at the location. Such placement can occur in anticipation of or during a tracking situation. For example, room units 120, 125 can be installed in a structure similarly to the installing of smoke detectors in residential, commercial, and industrial buildings. Each room unit 120, 125 can be connected to the electrical system of the structure or operate as battery powered units. If installed as part of the electrical system, the room units 120, 125 can be wired together into a central computer (e.g., the base station 80).

Each room unit 120, 125 has a unique identification (e.g., a serial number), and includes an identification (ID) transmitter 121. The control center 20 maintains a table that cross-references the serial numbers of the room unit 120, 125 with the particular room in the structure where that room unit 120, 125 is located.

In accordance with the principles of the invention, more than one portable field unit 110, 112 can simultaneously occupy a given room and communicate with each room unit 120, 125 placed in that room. Each portable field unit 110, 112 includes a central processing unit (CPU) 125 in communication with a radio frequency (RF) modem 128, a GPS receiver 132, a display 136, a user input device 138, and an identification (ID) receiver 142. In one embodiment, the RF modem 128 is a data modem. In another embodiment, the RF modem 128 transmits and receives voice information in addition to data. A power supply 146 provides power to the field unit 110. The power supply 146 can be implemented as battery (e.g., two 12 volt batteries in parallel) or electrical power. In one embodiment, the display 136 is a liquid crystal display that provides a user with the date and time, the indoor or outdoor location, and other status-related information. The user input device 138 enables the user to enter messages into the field unit 110 for transmission to the base station 80.

In one embodiment, described in more detail below, each field unit 110, 112, further includes an interface 140 to communicate with other systems external to that field unit.

During operation, each field unit 110, 112 can receive signals for determining indoor and outdoor object positions of the object wearing, carrying, or accompanying that field unit 110, 112. To compute the outdoor position of an object, the GPS receiver 132 continually receives raw uncorrected GPS signals from the signal transmitters 94 and/or 98. The RF modem 128 receives DGPS corrections from the base station 80. The CPU 125 receives, parses, and forwards the DGPS corrections to the GPS receiver 132 over a serial port. The GPS receiver 132 computes corrected object positions and continuously returns the corrected object positions to the CPU 124 over the serial port. The CPU 124 updates the position on the display 136 and buffers the longitude and latitude information for transmission back to the base station 80. At a specified time, described in more detail in connection with FIG. 7, the CPU 124 directs the RF modem 128 to transmit the corrected object position information to the base station 80.

To determine the indoor position of an object, the room unit 120 is placed at a predetermined location (indoors or outdoors) and the ID receiver 142 emits ultrasonic signals (i.e., pings) at pseudo-random intervals (e.g., in a range greater than 0 seconds and less than or equal to 2 seconds). Other types of ultrasonic signals can be used, such as, for example, a whistle. Upon detecting an ultrasonic signal, the room unit 120 awakes from a sleep mode and the ID transmitter 121 prepares to transmit a signal that conveys identification information. In one embodiment, the transmitted signal is an AM RF signal that includes a digitized serial number of the room unit. In general, the ID transmitter 121 can transmit any type of coded signal (e.g., optical, ultrasonic, etc.) capable of conveying this serial number information.

The ID receiver 142 receives the coded signal, decodes the serial number of the room unit 120, and forwards this serial number to the CPU 124. The CPU 124, through the RF modem 128, sends the serial number to the base station 80 in the appropriate time slot and radio frequency as described below in connection with FIG. 7. The time slot in which the serial number appears indicates to the base station 80 the particular field unit 110, 112 with which the serial number is associated. In another embodiment, the CPU 124 also sends information identifying the field unit 110, 112 with the transmitted room unit serial number.

In the event the CPU 124 concurrently receives an outdoor position from the GPS receiver 132 and an indoor position from the identification receiver 142, the CPU 124 in one embodiment selects the indoor position for transmission to the base station 80 as described above.

The base station 80 transmits the room unit serial number, and the identification of the field unit that transmitted the serial number, to the control center 120. From the tables that map serial numbers to room locations and field unit identifications to objects, the control center 20 produces an association between the object to the particular room.

In one embodiment, a given room can have two or more room units 120 that detect and respond to an ultrasonic signal emitted by one field unit 110. That field unit 110 accepts each reply from the room units 120 and reports the response time (relative to when the field unit 110 emitted the ultrasonic signal) for each of the room units 120. If the precise positions of each of such room units 120 within the room are known, the base station 80 or control center 20 can calculate the approximate posture (e.g., standing, sitting, prostrate, etc.) of the object.

As described above, in one embodiment each field unit 110, 112 can be incorporated with clothing worn by a tracked object, in part, because of the compact size of the units 110, 112. In one embodiment, each field unit 110, 112 is implemented in two boxes. One box houses the CPU 124, the radio modem 128, and the GPS receiver 132 and identification receiver 142 and approximates 50 cubic inches in size; the other box houses the GPS antenna 102, the radio modem antenna 104, and the ultrasonic sensor 145, and the display 136. The radio modem antenna 104 can operate as the antenna 144 for the ID receiver 142 and approximates 15 cubic inches in size.

An example of such clothing is a laser tag vest worn by military personnel. This vest includes optical sensors for detecting lasers used as weapon fire during battle simulations. Generally, the vest produces a palpable vibration when the simulated weapon fire has hit the soldier wearing the vest. For this embodiment, the field unit 110 incorporated in the vest includes an interface 140 in communication with the vest and with the CPU 124.

During a mock battle, laser light that strikes one of the optical sensors simulates a wound inflicted by weapon fire. The vest produces the palpable vibration that alerts the soldier of the event. When the laser hits the soldier, the triggered optical sensor notifies the interface 140. The interface 140 then communicates the event to the CPU 124, and the CPU 124 displays a text message to the soldier on the display 136 indicating the simulated result of the hit (e.g., wounded or killed in action).

The interface 140 can also be used to notify the wearer of the field unit 110 of other events that occur during the battle simulation. For example, the control center 20 may desire to communicate with the soldier that the soldier was wounded or killed in the simulated battle by an event other than by direct laser contact, such as an artillery attack in the location of the soldier. In this situation, the base station 80 broadcasts the appropriate message to the RF modem 128 of the field unit 110. The CPU 124 displays the message on the display 136 and causes the interface 140 to issue a message to the vest. The vest then produces the palpable vibration that alerts the soldier of the occurrence of an event. The soldier can then determine the type of event by reading the message in the display 136.

Figure 3B:
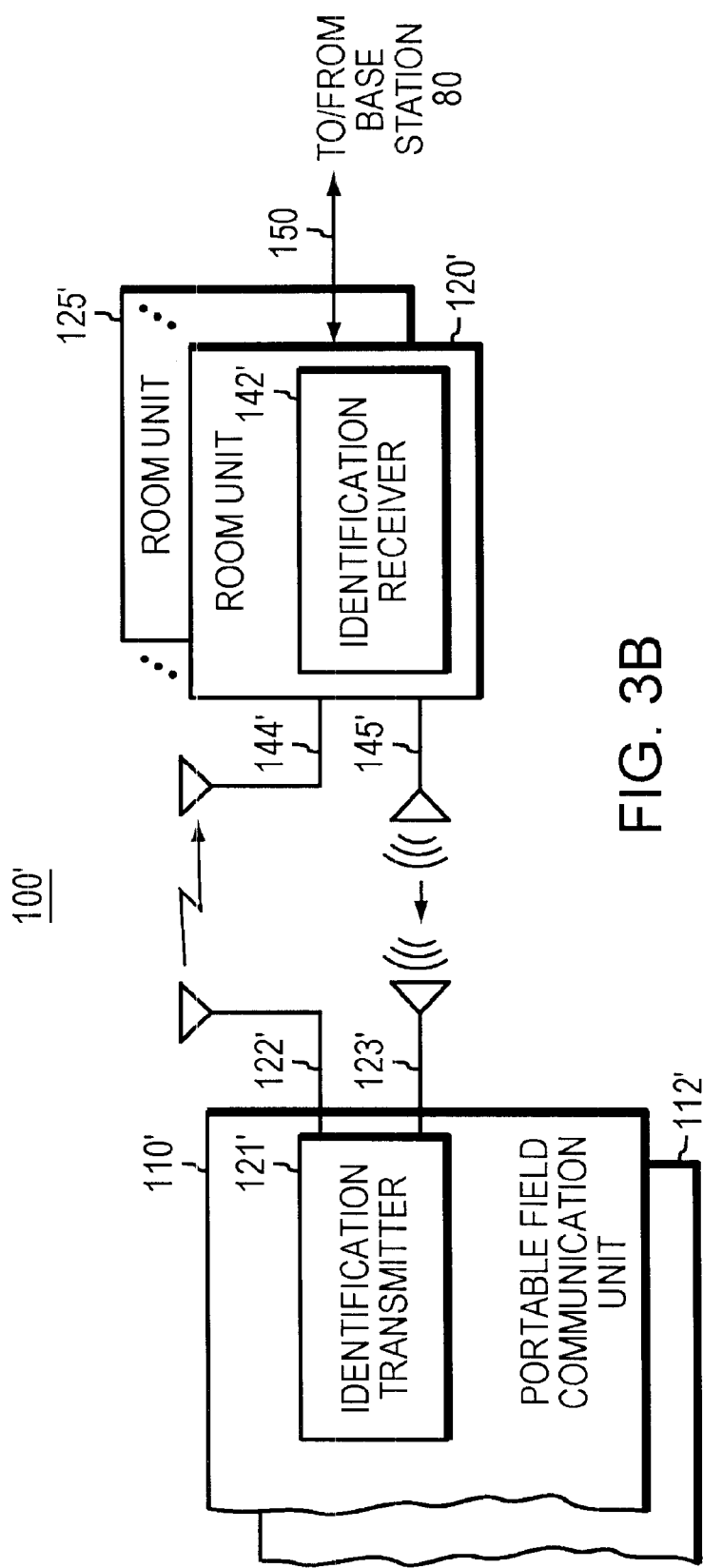

FIG. 3B illustrates an exemplary embodiment of the IGRS 100' in which the field unit 110' includes the ID transmitter 121' and the room unit 120' includes the ID receiver 142'. The other components of the IGRS 100' are not shown, but are similar to components 124, 128, 132, 136, 138, and 146 of IGRS 100 described above in FIG. 3A. In this embodiment, the room unit 120' is in communication with the base station 80 (or another computer in communication with the base station 80) over a communication link 150. This link 150 may be wired or wireless.

In this embodiment, the ID receiver 142' of the room unit 120' emits ultrasonic signals. When the object carrying the field unit 110', 112' enters the room and detects the ultrasonic signal, the ID transmitter 121' of that field unit 110' issues an AM RF signal that includes digitized identification of the object. This identification can be, for example, the name of the object or a serial number associated with the field unit 110'. Again, the signal emitted by the ID transmitter 121' can be any signal capable of carrying a coded message. The ID receiver 142' of the room unit 120' receives the RF signal, decodes the identification information, and forwards this information to the base station 80 over the communication link 150. Along with the information identifying the object, the room unit 120' transmits information identifying that room unit 120' (i.e., the serial number of the room unit). From this identification information, the base station 80 determines that the object carrying (or accompanying) the field unit 110' is in the room in which the room unit 120' was placed.

Conceivably the field unit 110' may transmit an outdoor object position, determined by the GPS receiver 132', to the base station 80 while the room unit 120' transmits the indoor object position. In this embodiment, the base station 80 chooses which object position to report to the control center 20. One embodiment gives priority to indoor object positions.

Time-Gated Window The embodiments of the IGRS 100 and 100' shown in FIGS. 3A and 3B, respectively, support the simultaneous tracking of multiple objects. Simultaneous tracking of multiple objects introduces the possibility of reporting false object positions because every ID transmitter 121 and ID receiver 142 operates on the same radio frequency. A false report might occur if an object successfully exchanges ultrasonic and RF signals with a room that the object does not actually occupy. For example, the object might instead be in an adjacent room, on an adjacent floor, in a hallway, or moving past a window just outside the room, from which position the exchanged ultrasonic and RF signals successfully reach their respective destinations.

The use of ultrasonic signals to initiate the communication between the room unit 120, 125, 120', 125' (hereafter, generally 120) and the field unit 110, 112, 110', 112' (hereafter, generally 110) operates to reduce the likelihood of false object position reports because these signals generally do not pass through walls. Thus, an ultrasonic signal emitted in one room is less likely to propagate to an adjacent room, hallway, or floor.

Another technique to reduce false object position reports is for the ID receiver 142, 142' (hereafter, generally 142) to aperiodically emit the ultrasonic signals and then open a window of time during which any RF signal received in reply is accepted. Conversely, the ID receiver 142 ignores any RF signal arriving outside of the window of time. The aperiodic pattern in which each ID receiver 142 emits ultrasonic signals is determined pseudo-randomly and independently of every other ID receiver 142. Thus, any two adjacent field units 110 in the embodiment of FIG. 3A, or any two adjacent room units 120' in the embodiment of FIG. 3B, are unlikely to have coincident open windows of time. Consequently, the possibility of an ID receiver 142 interpreting a RF signal from the wrong room as a response to an ultrasonic signal is decreased.

Further, in one embodiment the start of the window and the duration of the window are tuned for a desired distance between the ID transmitter 121, 121' (hereafter, generally 121) and the ID receiver 142, 142'. For example, the ID receiver 142 waits a predetermined period of time before opening the window of time to allow for the ultrasonic signal to propagate to the ID transmitter 121. In this example, if the desired distance is 15 feet, the delay before the window of time opens approximates the time required for an ultrasonic signal to travel through 15 feet of air. Consequently, the possibility of false position reports is further diminished because the sender of the ultrasonic signal does not accept any RF signals until the delay expires, despite having initiated communication. As for duration, the window of time remains open for a sufficient period to permit the timely return of the RF signal, which at the speed of light, occurs virtually instantaneously.

To further reduce false reports of object positions, the ID receiver 142 can require multiple successive, successful exchanges of ultrasonic and RF signals with the ID transmitter 121 before reporting that the object occupies the room.

To determine that an object has left the room, the ID receiver 142 (or in another embodiment the base station 80), counts the number of consecutive ultrasonic signals that the ID receiver 142 emitted without receiving a response from the ID transmitter 121. In another embodiment, rather than count ultrasonic signals, the ID receiver 142 waits a predetermined period (e.g., 1 second). When a threshold period or count is exceeded, the ID receiver 142 is determined to have left the room.

Figure 4:
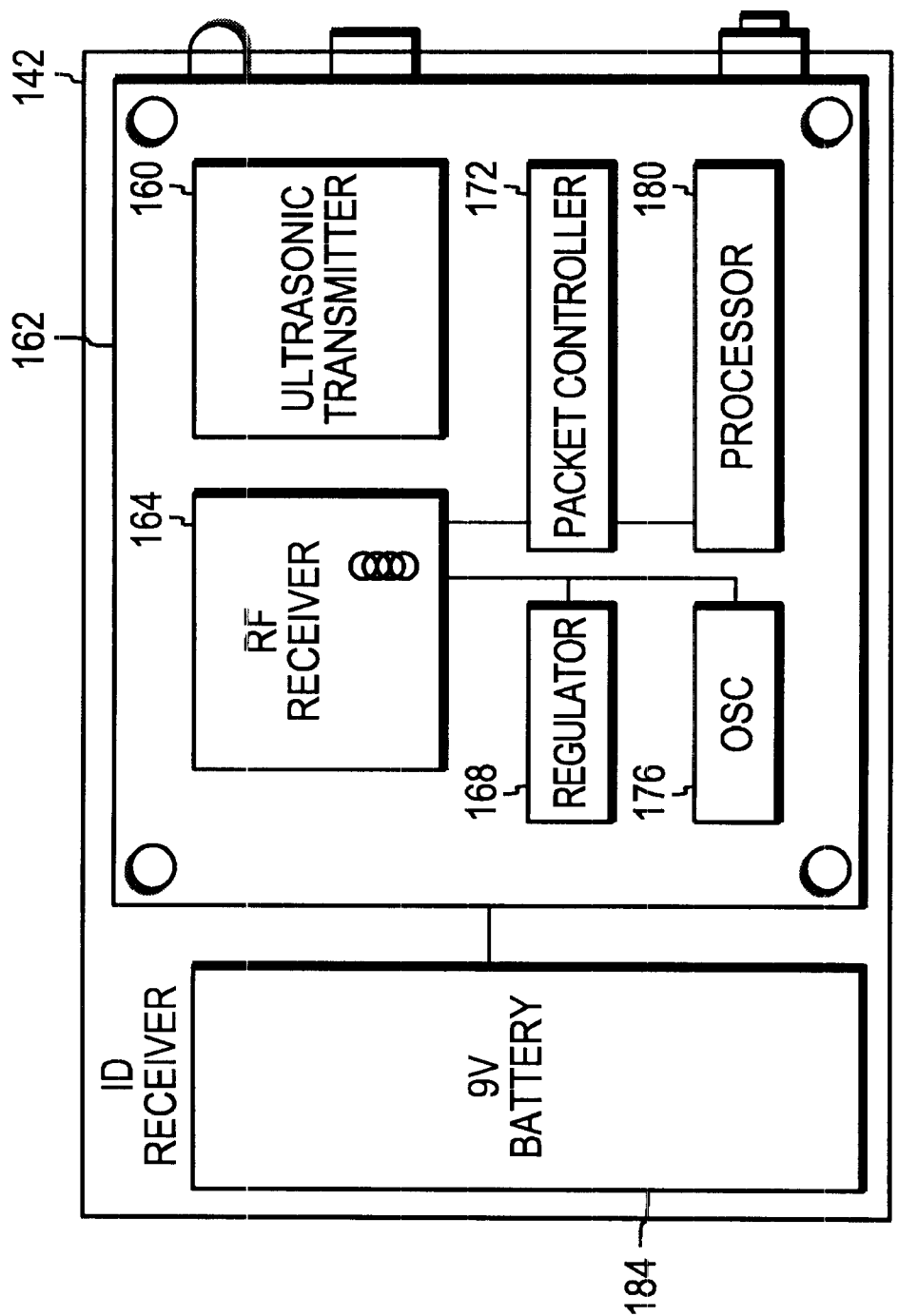
FIG. 4 is an exemplary block diagram of the ID receiver.

FIG. 4 shows an exemplary embodiment of each ID receiver 142. The ID receiver 142 includes single electrical board 162 powered by a power supply 184 (here, a 9 volt battery). The electrical board 162 includes an ultrasonic transmitter 160, a RF receiver 164, a regulator 168, a packet controller 172, an oscillator 176, and a processor 180. The processor 180 controls when the ultrasonic transmitter 160 emits ultrasonic signals and determines identification information from identification signals received by the RF receiver 164 via the packet controller 172.

Figure 5:
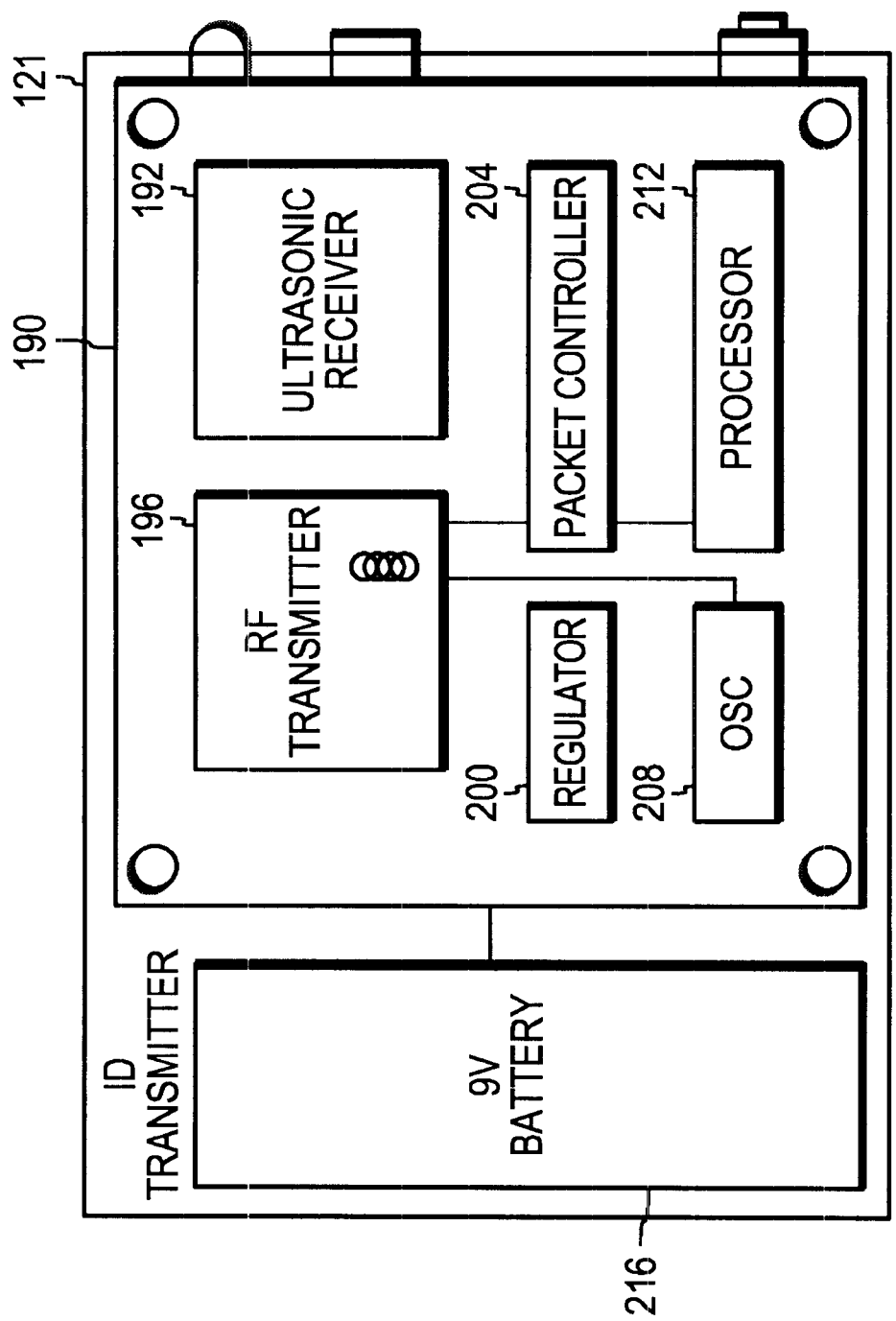
FIG. 5 is an exemplary block diagram of the ID transmitter.

FIG. 5 shows an exemplary embodiment of each ID transmitter 121. The ID transmitter 121 includes an electrical board 192 powered a power supply 216 (here, a 9 volt battery). The electrical board 192 includes an ultrasonic receiver 192, a RF transmitter 196, a regulator 200, a packet controller 204, an oscillator 208, and a processor 212. The processor 212 monitors the ultrasonic receiver 192 and sends the identification information via the packet controller 204 to the RF transmitter 196 when the ultrasonic receiver 192 detects an ultrasonic signal.

Figure 6:
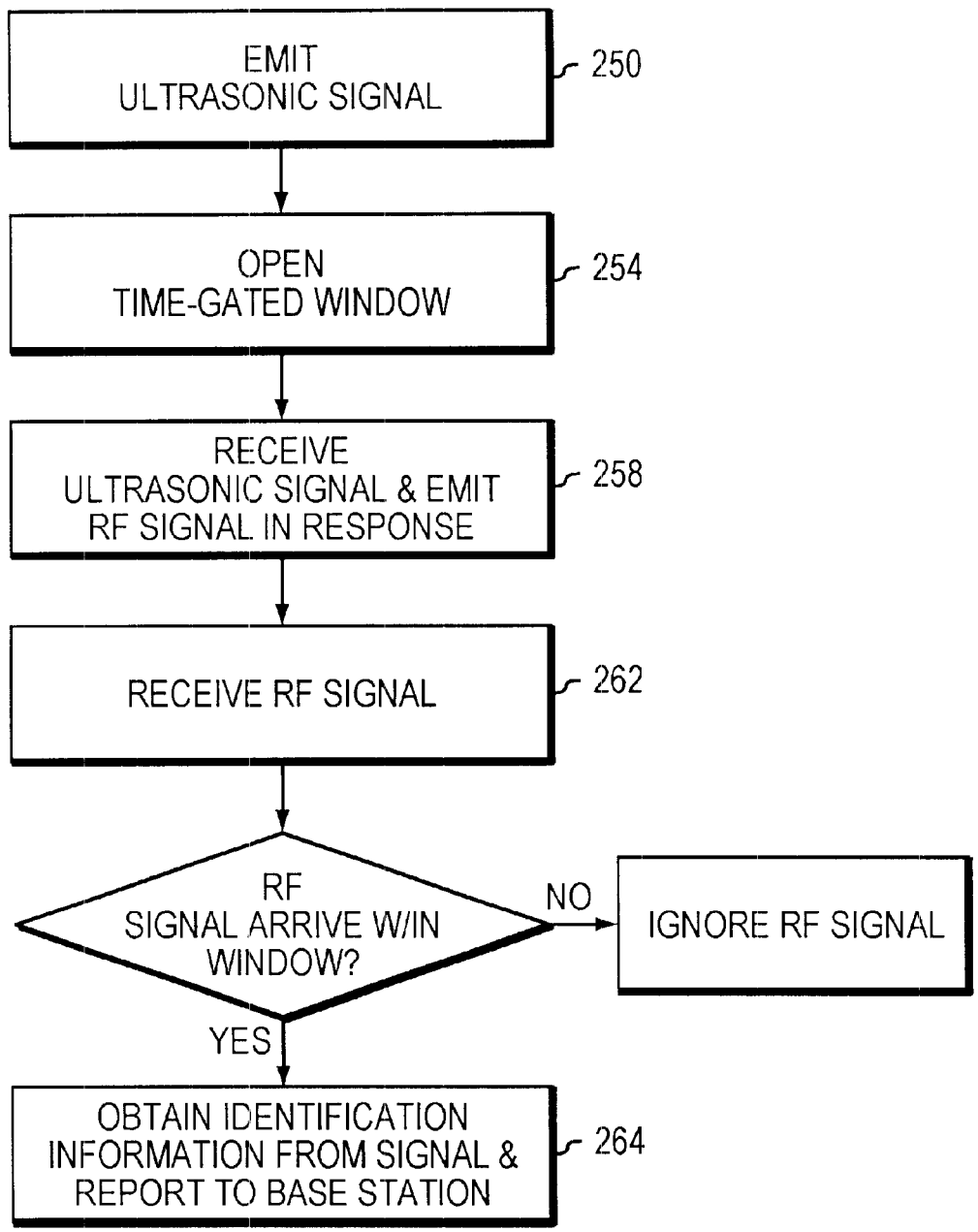
FIG. 6 is a flow diagram illustrating a process by which the ID receiver and ID transmitter communicate in accordance with the principles of the invention.

FIG. 6 is a flow diagram illustrating a process by which the ID receiver 142 and ID transmitter 121 communicate in accordance with the principles of the invention. The ID receiver 142 aperiodically emits (step 250) an ultrasonic signal, and opens (step 254) a window of time having a limited duration for receiving a response to the ultrasonic signal from the other of the communication units. In one embodiment, the ID receiver 142 waits a predetermined period of time before opening the window of time to allow for the ultrasonic signal to propagate to the ID transmitter 121.

The ID transmitter 121 receives (step 258) the ultrasonic signal and emits a RF signal in response. The RF signal includes identification information. If the ID transmitter 121 is part of the room unit 120, then this identification information identifies the room unit. If the ID transmitter 121 is part of the field unit 110 accompanying the object, then the identification information identifies the object or the particular field unit 110.

The ID receiver 142 receives (step 262) the RF signal and accepts the response if the signal arrives within the window of time. Acceptance of the response creates an association between the identities of the room unit 120 and the tracked object; that is, the tracked object is deemed to be in the room having the room unit 120. The ID receiver 142 subsequently reports (step 264) the identification information to the base station 80.

In one embodiment, steps of 250, 254, 258, and 262 must successfully occur multiple times in succession, with the receiver 142 obtaining the same identification information for both occurrences, before the ID receiver 142 reports that identification information to the base station 80. If the RF signal arrives outside of the window of time, the ID receiver 142 ignores that signal.

Figure 7:
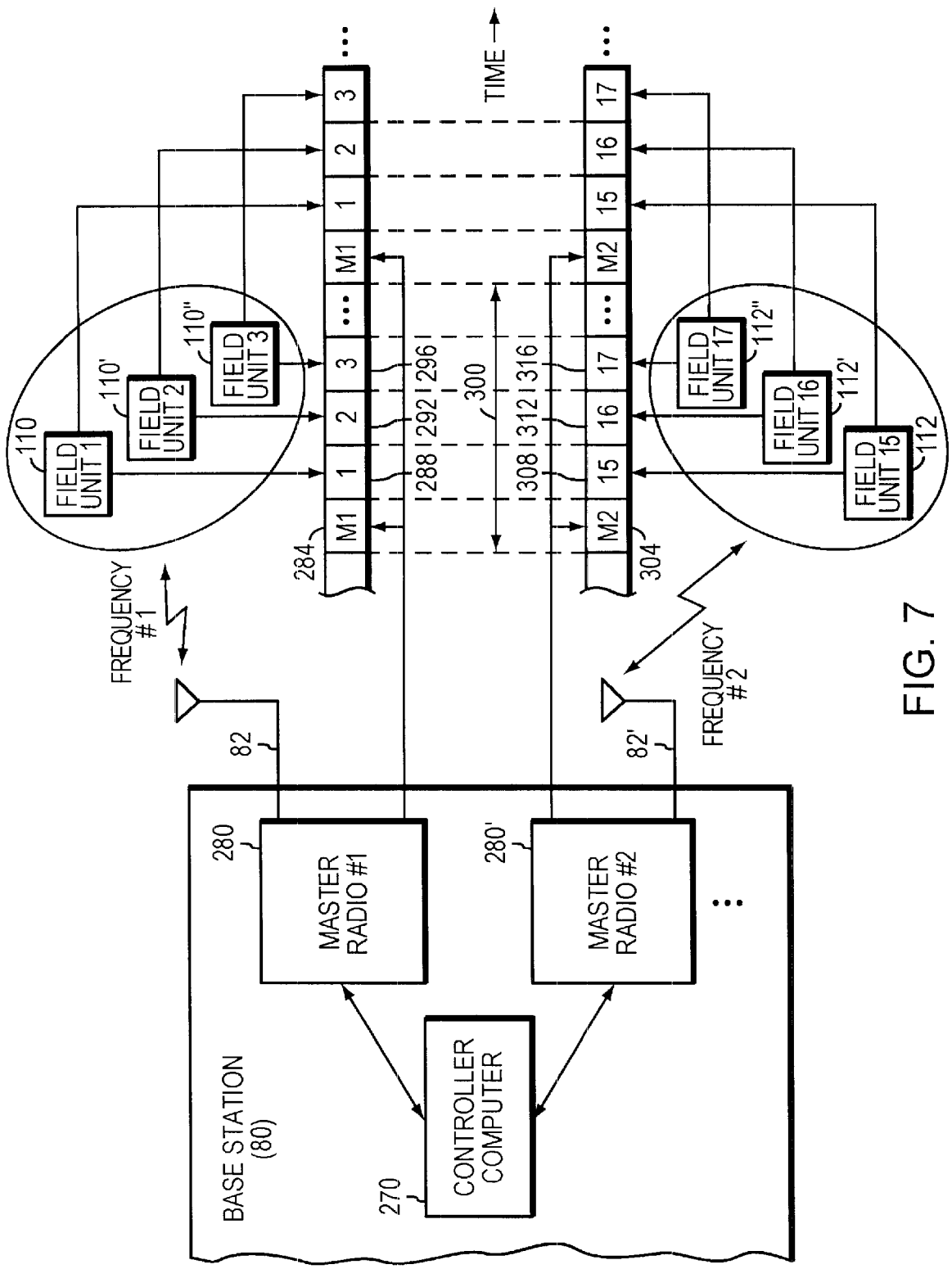
FIG. 7 is a block diagram illustrating frequency allocation and time slot assignments for exchanging object position information and messages between the base station and each portable communication unit of the IGRS.

FIG. 7 shows an exemplary embodiment of the frequency and time slot allocation used by the base station 80 and each field unit 110, 112 of the IGRS 100 when reporting object position information and exchanging messages. As shown, the base station 80 includes a computer 270 in communication with a plurality of master radios 280, 280' (generally 280). Each master radio 280 transmits and receives radio signals at a different predetermined frequency than every other master radio 280.

The field units 110, 112 are organized into groups according to a predetermined frequency at which those field units 110, 112 communicate with one of the master radios 280. Some of the field units 110, 112 communicate at frequency #1, others at frequency #2, and so on according to the number or master radios 280 at the base station 80. Accordingly, each field unit 110, 112 is in communication with one master radio 280, and each master radio 280 is concurrently in communication with one group of field units, which includes one or more field units 110, 112 concurrently communicating with that one master radio 280. To enable the exchange of information between each such field unit 110, 112 and that master radio 280 at a particular frequency, the base station 80 assigns a time slot for each field unit 110, 112 and for the master radio 280 to use during a single reporting period 300. Accordingly, by increasing the number of frequencies used or the reporting period 300, the positioning system 30 can concurrently support almost an unlimited number of field units 110.

In the example shown in FIG. 7, the master radio 280 communicates with field units 110, 110', and 110' (generally 110) at frequency #1. The master radio 280 has time slot 284 during which to transfer information to each field unit 110. During the time slot 284, the master radio 280 transmits information such as synchronization signals, text messages, and, in one embodiment, voice data. Each field unit 110, 110', 110" has a subsequent time slot 288, 292, 296, respectively, during which to report position information (e.g., DGPS position information or the room unit serial number) and to send text messages to the master radio 280 of the base station 80.

Also shown in FIG. 7, the master radio 280' communicates with field units 112, 112', and 112' (generally 112) at frequency #2. The master radio 280' has time slot 304 during which to transfer information to each field unit 120, and each field unit 112, 112', 112" has a subsequent time slot 308, 312, 316, respectively, during which to report position information to the master radio 280' of the base station 80.

Because of the assignment of each field unit 110 to a particular time slot, the base station 80 is able to associate position information extracted from each time slot with a particular field unit 110. The base station 80 relays the position information to the control center 20. The control center 20 uses the position information to place each object within the context of a displayed map. In one embodiment, the positions of the objects are updated every thirty seconds.

The principles of the invention are applicable to a variety of uses. For example, hospitals can use the principles of the invention to keep track of patients and high-value equipment within the facility. Here, each hospital room has a room unit 120 installed and each patient or piece of equipment is fitted with a field unit 110.

In another example, a company could track the exact location of every person on its premises by installing room units 120 in all rooms and giving each employee or visitor a field unit 110. This system would allow the company to monitor access to restricted areas, track down people for meetings, and dynamically route telephone calls to a person's current location.

While the invention has been shown and described with reference to specific preferred embodiments, it should be understood by those skilled in the art that various changes in form and detail may be made therein without departing from the spirit and scope of the invention as defined by the following claims.

What is claimed is:

1. A system for determining a position of an object, comprising:
   a first communication unit having a transmitter that emits a sound signal; and
   a second communication unit having a receiver to receive the sound signal and a transmitter to transmit a responsive identification signal,
   wherein one of the two communication units is placed at a predetermined position and the other of the two communication units is placed with an object, and
   wherein the object is identified as being located at the predetermined position if the two communication units establish communications by exchanging the sound and identification signals.

2. The system of claim 1 further comprising:
   a timer producing a window of time;
   a receiver in the first communication unit in communication with the timer, the receiver accepting any identification signal that arrives within the window of time and ignoring any identification signal that arrives outside of the window of time.

3. The system of claim 2 wherein the timer opens the window of time a predetermined period of time after the transmitter of the first communication unit emits the sound signal.

4. The system of claim 3 wherein the predetermined period of time approximates a period of time required for the sound signal to propagate to the second communication unit.

5. The system of claim 1 wherein the first communication unit is placed at the predetermined position and the second communication unit accompanies the object.

6. The system of claim 1 wherein the first communication unit accompanies the object and the second communication unit is placed at the predetermined position.

7. The system of claim 1 wherein the identification signal is a radio frequency (RF) signal.

8. The system of claim 1 wherein the identification signal includes information that leads to identifying the predetermined position.

9. The system of claim 1 wherein the identification signal includes information that leads to identifying the object.

10. The system of claim 1 wherein the identification signal includes information related to an identity of the object and further comprising a processor in communication with one of the communication units to receive the identification signal and use the identification information in the identification signal to produce position information indicating that the object is at the predetermined position.

11. The system of claim 10 further comprising a differential global positioning system (DGPS), in communication with the processor, capable of computing a position of the object from GPS signals received from remote signal transmitters.

12. The system of claim 10 wherein one of the two communication units includes a second transmitter in communication with the processor, the second transmitter transmitting the position information to a base station.

13. The system of claim 12 wherein the first communication unit includes the second transmitter that transmits the position information to the base station.

14. The system of claim 1 further comprising a base station in communication with one of the communication units to receive the position information obtained by that communication unit.

15. The system of claim 1 wherein the sound signal is an ultrasonic signal.

16. The system of claim 1 wherein the transmitter transmits sound signals aperiodically.

17. A method for tracking an object in a system having a first communication unit placed at a predetermined position and a second communication unit placed with the object, the method comprising:
   (a) emitting a sound signal from one of the communication units;
   (b) opening a window of time having a limited duration for receiving a response to the sound signal from the other of the communication units;
   (c) accepting the response to the sound signal if the response arrives within the opened window of time; and
   (d) associating the predetermined position with the object based on information provided with the response.

18. The method of claim 17 further comprising:
   waiting a predetermined period of time before opening the window of time to allow for the sound signal to propagate to the other of the communication units.

19. The method of claim 17 further comprising:
   computing position information of the object from GPS signals received from a plurality of remote signal transmitters using a differential global positioning system (DGPS).

20. The method of claim 17 further comprising:
   assigning a frequency to one of the communication units for communicating with a base station; and
   allocating a time slot within the assigned frequency during which that one communication unit can transmit position information to the base station.

21. The method of claim 17 further comprising:
   detecting the sound signal at more than one position; and
   calculating an approximate position of the object based in part on when the sound signal was detected at each position.

22. The method of claim 17 further comprising receiving a radio frequency (RF) signal as the response to the sound signal.

23. The method of claim 17 further comprising repeating the emitting, the opening, and the accepting before associating the predetermined position with the object.

24. The method of claim 17 wherein the emitting of the sound signal occurs aperiodically.

25. A method for tracking a plurality of objects in a system having a first communication unit placed at a predetermined position and a plurality of second communication units each accompanying a respective object from the plurality of objects, the method comprising:
   (a) emitting a sound signal from each of the second communication units;
   (b) opening a window of time having limited duration by each of the second communication units in response to emitting the sound signal; and
   (c) accepting by each second communication unit a response to the sound signal emitted by such second communication unit if that response arrives within the window of time opened by that second communication unit and ignoring any response that arrives outside of that window of time.

26. The method of claim 25, further comprising:
   determining position information by each of the second communication units; and
   assigning one of a plurality of frequencies to each of the second communication units for transmitting the position information determined by that second communication unit; and
   allocating a time slot to each of the second communication units within the frequency assigned to that second communication unit during which that second communication unit can transmit the determined position information.

27. The method of claim 25 wherein the emitting of the sound signal occurs aperiodically.

28. A system for tracking a position of an object, comprising:
   a global positioning system accompanying the object, the global positioning system computing position information about the object when the global positioning system is able to receive signals from a signal transmitter; and
   an indoor tracking system including a communication unit placed at a predetermined position, the indoor tracking system determining position information about the object when the object enters within a predetermined range of the communication unit by communicating with a communication unit located with the object using sound signaling.

29. The system of claim 28 further comprising a processor in communication with the global positioning and the indoor tracking systems to receive position information about the object.

30. In a system including a transceiver placed at a predetermined location, a portable apparatus accompanying an object used for determining a position of the object, comprising:
   a global positioning system (GPS) receiver computing the position of the object from signals concurrently received from a plurality of signal transmitters; and
   a communication unit exchanging sound and radio frequency signals with the transceiver to determine the position of the object when the object is within range of the transceiver.

31. The portable apparatus of claim 30 wherein the communication unit comprises:
   an ultrasonic transmitter aperiodically emitting an ultrasonic signal; and
   a radio frequency (RF) modem receiving an identification signal from the transceiver in response to the emitted ultrasonic signal.

32. The portable apparatus of claim 30 wherein the communication unit comprises:
   a receiver receiving an ultrasonic signal emitted by the transceiver; and
   a radio frequency (RF) modem transmitting an identification signal in response to the received sound signal.

33. The portable apparatus of claim 30 further comprising a radio frequency (RF) modem exchanging signals with a second transceiver.

34. The portable apparatus of claim 30 wherein the exchanged signals represent voice data.

* * * * *